United States Patent
Brown et al.

[19]

[11] Patent Number: 6,142,905
[45] Date of Patent: Nov. 7, 2000

[54] FULL-TIME FOUR-WHEEL DRIVE TRANSMISSION WITH LIMITED SLIP CLUTCH

[75] Inventors: David Brown, Hopton, United Kingdom; Alan P. Zajac, Clay, N.Y.

[73] Assignee: New Venture Gear, Inc., Troy, Mich.

[21] Appl. No.: 09/018,190

[22] Filed: Feb. 4, 1998

Related U.S. Application Data

[60] Provisional application No. 60/041,285, Mar. 21, 1997.

[51] Int. Cl.$^7$ .................................................. F16H 37/08
[52] U.S. Cl. .......................... 475/206; 475/204; 475/198; 74/665 GA; 180/248; 180/249
[58] Field of Search ..................................... 475/198, 199, 475/201, 206, 207, 208, 204; 74/665 GA; 180/248, 249, 250

[56] References Cited

U.S. PATENT DOCUMENTS

| | | | |
|---|---|---|---|
| 2,262,710 | 11/1941 | Lang | 475/198 |
| 3,235,021 | 2/1966 | Hill | 180/249 |
| 3,732,943 | 5/1973 | Panhard | 180/55 |
| 3,894,446 | 7/1975 | Snoy et al. | 180/250 X |
| 4,280,583 | 7/1981 | Stieg | 180/250 |
| 4,643,045 | 2/1987 | Katayama | 475/198 |
| 4,671,136 | 6/1987 | Katayama | 475/206 |
| 4,779,699 | 10/1988 | Hatano | 180/248 |
| 4,787,269 | 11/1988 | Matsumoto | 74/665 GA |
| 4,805,720 | 2/1989 | Clenet | 180/248 |
| 4,817,753 | 4/1989 | Hiketa | 180/249 |
| 4,831,891 | 5/1989 | Kato et al. | 74/745 |
| 4,875,698 | 10/1989 | Uchiyama | 180/233 |
| 4,878,399 | 11/1989 | Kameda | 74/665 GA X |
| 4,907,472 | 3/1990 | Mura | 475/206 X |
| 5,017,183 | 5/1991 | Teraoka | 475/206 X |
| 5,042,610 | 8/1991 | Shiraishi et al. | 180/249 |
| 5,046,998 | 9/1991 | Frost | 475/221 |
| 5,086,867 | 2/1992 | Hirota et al. | 180/248 |
| 5,123,293 | 6/1992 | Umemoto et al. | 74/333 |
| 5,143,167 | 9/1992 | Moriyama et al. | 180/248 |
| 5,188,574 | 2/1993 | Echigo et al. | 475/206 |
| 5,334,116 | 8/1994 | Baxter, Jr. | 475/206 X |
| 5,370,018 | 12/1994 | Kwasniewski | 74/606 R |
| 5,443,426 | 8/1995 | Frost | 475/91 |
| 5,456,642 | 10/1995 | Frost | 475/93 |
| 5,515,940 | 5/1996 | Shichinohe et al. | 74/665 GA X |
| 5,561,749 | 10/1996 | Wilson et al. | 475/198 X |
| 5,582,263 | 12/1996 | Varma et al. | 180/247 |
| 5,662,543 | 9/1997 | Forsyth | 475/198 |
| 5,704,866 | 1/1998 | Pritchard et al. | 475/206 |

FOREIGN PATENT DOCUMENTS

2035930  6/1980  United Kingdom .

*Primary Examiner*—Charles A Marmor
*Assistant Examiner*—Ankur Parekh
*Attorney, Agent, or Firm*—Harness, Dickey & Pierce, P.L.C.

[57] ABSTRACT

A transmission for a four-wheel drive vehicle having a multi-speed geartrain and power transfer mechanism incorporated into a common housing assembly. The multi-speed geartrain includes a input shaft, a mainshaft, and a plurality of constant-mesh gearsets arranged for selectively coupling the mainshaft to the input shaft for driven rotation at various speed ratios. The mainshaft can be selectively coupled to the power transfer mechanism for establishing two alternative power transmission routes. In particular, a range shift mechanism is provided for establishing a high-range power transmission route and a low-range power transmission route from the mainshaft to the input of an interaxle differential. The torque delivered to the interaxle differential is split between the front and rear drivelines to establish a full-time four-wheel drive mode. A transfer clutch is provided for automatically controlling slip and torque biasing between the outputs of the interaxle differential.

20 Claims, 6 Drawing Sheets

| GEAR | RATIO | CLUTCH SLEEVE 140 | CLUTCH SLEEVE 150 | CLUTCH SLEEVE 174 | RANGE SLEEVE 194 |
|---|---|---|---|---|---|
| REV-LOW | -10.513 | A | D | R | N |
| 1ST-LOW | 10.475 | A | D | N | L |
| 2ND-LOW | 7.350 | B | D | N | L |
| 3RD-LOW | 5.241 | A | C | N | L |
| 1ST-HIGH | 3.677 | B | C | N | L |
| 2ND-HIGH | 2.686 | A | D | N | H |
| 3RD-HIGH | 1.885 | B | D | N | H |
| 4TH-HIGH | 1.3438 | A | C | N | H |
| 5TH-HIGH | 0.9429 | B | C | N | H |
| REV-HIGH | -4.083 | B | D | R | N |

FULL-TIME FOUR-WHEEL DRIVE TRANSMISSION WITH LIMITED SLIP CLUTCH

This application claims priority under 35 U.S.C. §119(e) to United States Provisional Application No. 60/041,285, filed on Mar. 21, 1997.

BACKGROUND OF THE INVENTION

The present invention relates generally to transmissions for use in four-wheel drive vehicles. More particularly, the present invention is directed to a transmission having a multi-speed geartrain and a power transfer mechanism contained in a single unit.

As is known, the majority of four-wheel drive vehicles are equipped with a transfer case mounted to a multi-speed transmission for directing power from the engine to all four wheels. To accommodate different road surfaces and conditions, many transfer cases are equipped with a mode shift mechanism which permits the vehicle operator to selectively uncouple one set of wheels for establishing a two-wheel drive mode in addition to the four-wheel drive mode. In addition, some transfer cases are also equipped with a gear reduction unit for providing high-range and low-range four-wheel drive modes. Finally, some transfer cases are equipped with an interaxle differential for permitting torque proportioning and speed differentiation between the front and rear drivelines of the four-wheel drive vehicle.

In an effort to minimize the overall size of the drivetrain used in four-wheel drive vehicles, it has been proposed to utilize a transmission of a transaxle-type normally used to drive the front wheels of a front wheel drive vehicle as a four-wheel drive geartrain. In particular, British Patent No. 2,035,930 to Jones et al. teaches of rotating the front wheel drivetrain (i.e., engine and transaxle) 90° such that the transaxle outputs can be interconnected to the front and rear drivelines of the motor vehicle. While such an arrangement may provide an economical drivetrain layout for a full-time four-wheel drive vehicle, the practical applications for such an arrangement are severely limited. In particular, such an arrangement does not permit the vehicle operator to selectively shift "on-the-fly" between high and low four-wheel drive modes, nor can one of the outputs be selectively disconnected from its driveline for establishing a two-wheel drive mode.

Accordingly, the need exists for a transmission which can be used in most conventional four-wheel drive applications and which permits the vehicle operator to selectively shift between the available drive modes and speed ranges.

SUMMARY OF THE INVENTION

It is therefore an object of the present invention to provide a transmission for use with four-wheel drive vehicles having a multi-speed geartrain and a power transfer mechanism integrated into a single unit.

According to yet another object, the transmission has a power transfer mechanism equipped with a transfer clutch for automatically controlling torque distribution and speed differentiation across an interaxle differential in response to slip between the front and rear output shafts.

The transmission of the present invention includes a multi-speed geartrain including a input shaft, a mainshaft, and a plurality of constant-mesh gearsets which can be selectively engaged to couple the mainshaft to the input shaft for driven rotation at various speed ratios. The mainshaft can be selectively coupled to a power transfer mechanism for establishing two alternative power transmission routes. In particular, the power transfer mechanism includes a synchronized range shift mechanism which is operable for establishing a high-range transmission route and a low-range transmission route from the mainshaft to the input of an interaxle differential. The torque delivered to the interaxle differential is split between the front and rear drivelines to establish a full-time four-wheel drive mode. Optionally, the power transfer mechanism further includes a transfer clutch which can be passively or automatically actuated to limit slip and bias the torque distribution between the front and rear drivelines.

BRIEF DESCRIPTION OF THE DRAWINGS

Further objects, features and advantages of the present invention will become apparent to those skilled in the art from studying the following description and the accompanying drawings in which.

DETAILED DESCRIPTION OF THE PREFERRED EMBODIMENTS

The present invention relates generally to a transmission for use in four-wheel drive vehicles having a multi-speed geartrain and a power transfer mechanism integrated into a common housing assembly. As such, the transmission is operable for transferring power from a longitudinally-aligned engine to the front and rear drivelines of a four-wheel drive vehicle. The power transfer mechanism includes an interaxle differential which interconnects the output of the geartrain to the front and rear drivelines for establishing a full-time four-wheel drive mode. A transfer clutch is incorporated into the power transfer mechanism to automatically regulate slip between the output members of the interaxle differential and control the torque biasing therebetween. Thus, the transfer clutch functions as an on-demand limited slip device.

Figure 1:
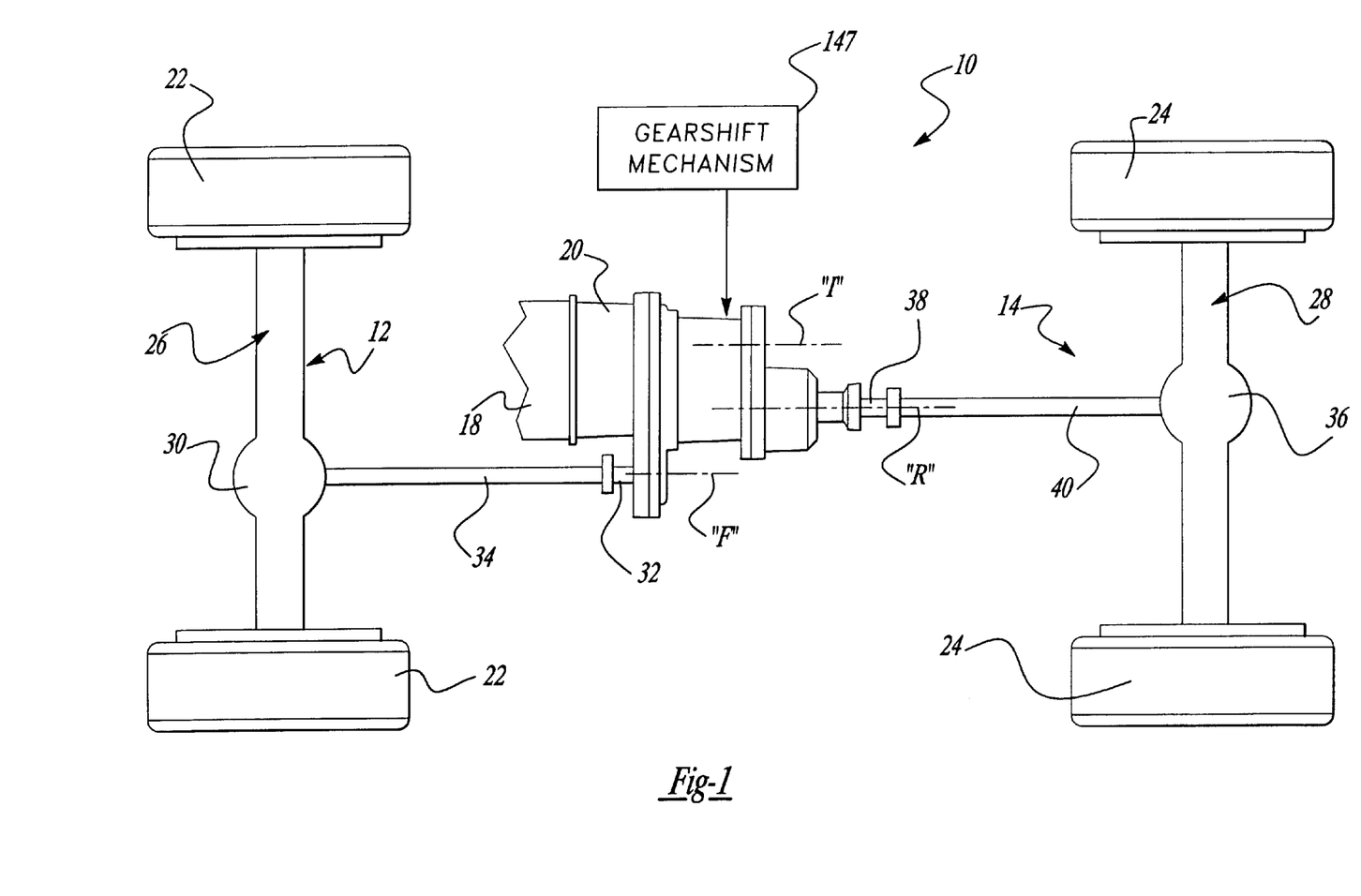
FIG. 1 is a schematic view of a four-wheel drive motor vehicle equipped with a transmission according to the present invention.

Referring to FIG. 1, a motor vehicle 10 is schematically shown. Vehicle 10 has a front driveline 12 and a rear driveline 14 drivable from a source of power, such as an engine 18, through a transmission 20. Engine 18 is mounted in an in-line or longitudinal orientation along the long axis of vehicle 10 and its output is coupled to the input of transmission 20. Front and rear sets of wheels 22 and 24 are part of front and rear drivelines 12 and 14, respectively, and are connected at opposite ends of front and rear axle assemblies 26 and 28, respectively. Front axle assembly 26 includes a front differential 30 that is coupled to a front output 32 of transmission 20 via a front propshaft 34.

Likewise, rear axle assembly 28 includes a rear differential 36 that is coupled to a rear output 38 of transmission 20 via a rear propshaft 40. As is conventional, one or more universal joints (not shown) may be installed on opposite ends of propshafts 34 and 40, as required. As will be detailed, an inherent feature of transmission 20 is that its outputs 32 and 38 can be offset relative to each other as well as to the transmission input to provide improved underbody packaging. As shown, the input to transmission 20 is rotatable about a first axis ("I") while front and rear outputs 32 and 38 are respectively shown rotatable about a second axis ("F") and a third axis ("R").

Figure 2:
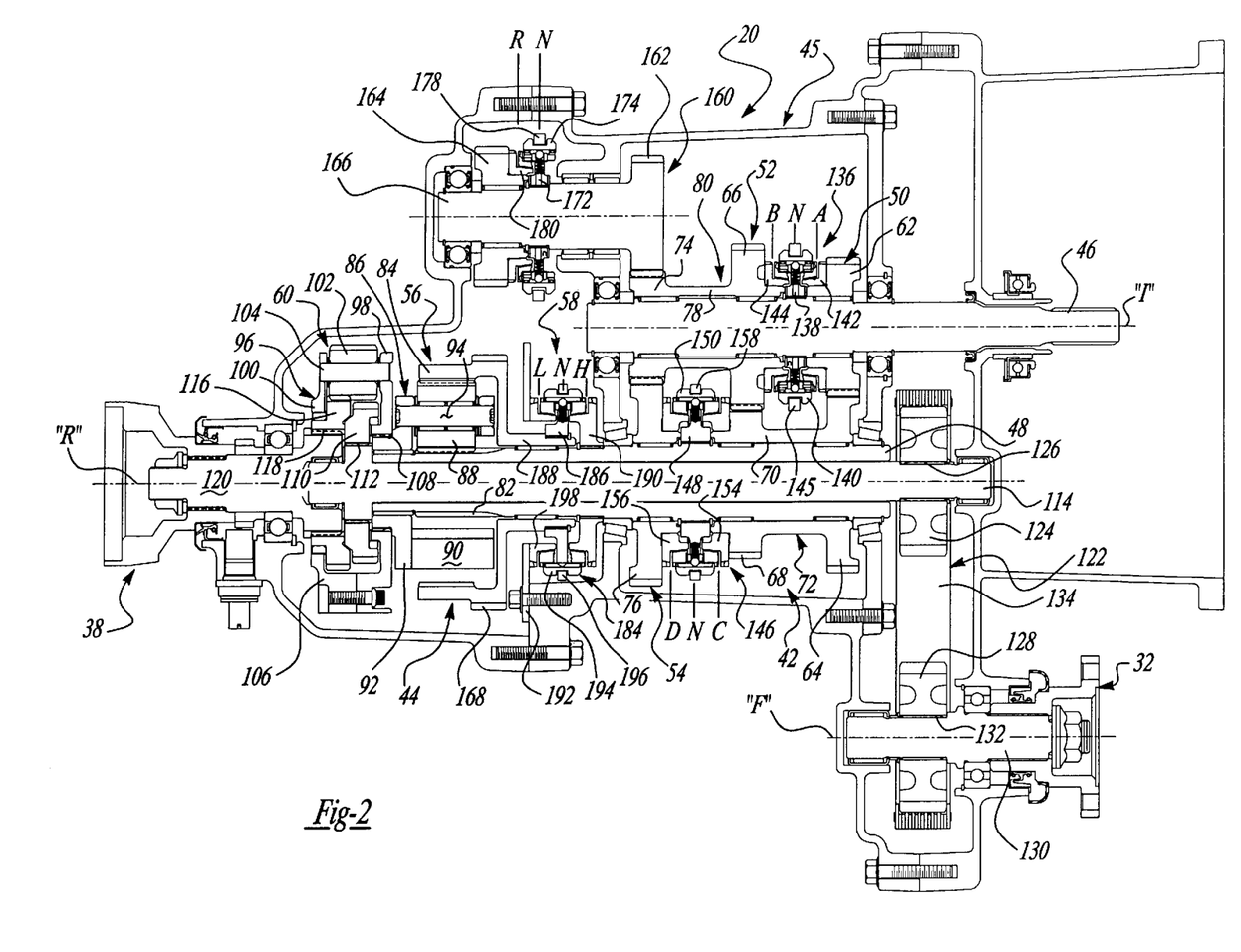
FIG. 2 is a sectional view of a transmission constructed according to the present invention.

With particular reference to FIG. 2, transmission 20 is shown to include two primary sections, namely, a multi-speed geartrain 42 and a power transfer mechanism 44, both of which are located with a housing assembly 45. Geartrain 42 includes an input shaft 46 driven by the output of engine 18 through engagement of a conventional manually-operable clutch (not shown), a mainshaft 48, and a series of constant-mesh gearsets 50, 52 and 54. As will be detailed, each gearset can be selectively engaged for coupling mainshaft 48 to input shaft 46 for rotation at a predetermined gear or speed ratio. Thus, rotary power (i.e., drive torque) from engine 18 is selectively delivered from input shaft 46 to mainshaft 48 through the gearsets. Power is thereafter delivered from mainshaft 48 to front and rear outputs 32 and 38 via power transfer mechanism 44. In general, power transfer mechanism 44 of transmission 20 includes a planetary gearset 56, a synchronized range shift mechanism 58 and an interaxle differential 60 interconnecting the output of planetary gearset 56 to front output 32 and rear output 38. Interaxle differential 60 permits speed differentiation between front output 32 and rear output 38 while delivering drive torque thereto at a predetermined torque split or ratio. Accordingly, a differentiated or "full-time" four-wheel drive mode is established by transmission 20. While interaxle differential 60 is specifically shown as a dual-planetary gearset, it will be appreciated that any suitable equivalent differential device (i.e., single planetary or beveled gearset) known in the transmission art can be used in substitution therefor.

With continued reference to FIG. 2, first gearset 50 is shown to include a first input gear 62 rotatably supported on input shaft 46 and which is in constant-mesh with a first drive gear 64 rotatably supported on mainshaft 48. Second gearset 52 includes a second input gear 66 rotatably supported on input shaft 46 and which is in constant mesh with a second drive gear 68 rotatably supported on mainshaft 48. First drive gear 64 and second drive gear 68 are shown integrally formed on a stubshaft 70 to define a first compound gear 72. Third gearset 54 is shown to include a third input gear 74 rotatably supported on input shaft 46 and which is in constant mesh with a third drive gear 76 rotatably supported on mainshaft 48. Second input gear 66 and third input gear 74 are integrally formed on a stubshaft 78 for defining a second compound gear 80.

Planetary gearset 56 includes a sun gear 82 formed integrally on an end portion of mainshaft 48, a ring gear 84, and a carrier assembly 86 having a plurality of pinion gears 88 rotatably supported therefrom which are meshed with sun gear 82 and ring gear 84. In particular, carrier assembly 86 includes a front carrier plate 90 and a rear carrier plate 92 which are suitably interconnected, with pinion shafts 94 extending therebetween on which pinion gears 88 are rotatably supported.

In general, interaxle differential 60 has an input driven by carrier assembly 86 of planetary gearset 56, a first output connected to front output 32, and a second output connected to rear output 38. More specifically, interaxle differential 60 includes a planet carrier 96 having a front carrier ring 98 interconnected to a rear carrier ring 100, a set of first pinions 102 rotatably supported on pinion shafts 104 extending between carrier rings 98 and 100, and a set of second pinions 106 (shown in phantom) likewise rotatably supported on pinion shafts (not shown) extending between carrier rings 98 and 100. Planet carrier 96 is driven by the output of planetary gearset 56 in that carrier ring 98 is fixed via a splined connection 108 to rear carrier plate 92 of carrier assembly 86. As seen, the first output of interaxle differential 60 is a first sun gear 110 fixed via a splined connection 112 to one end of a transfer shaft 114 which concentrically extends through hollow mainshaft 48 for rotation relative thereto about the third axis. The second output of interaxle differential 60 is a second sun gear 116 fixed via a splined connection 118 to a rear output shaft 120. Rear output shaft 120 is adapted to be interconnected to rear propshaft 40 in a conventional manner. Each first pinion 102 is in constant mesh with second sun gear 116 and with a corresponding one of second pinions 106. Second pinions 106 are also in constant mesh with first sun gear 110. Thus, interaxle differential 60 transfers drive torque from planet carrier 96 to transfer shaft 114 via first sun gear 110 and to rear output shaft 120 via second sun gear 116. This arrangement permits speed differentiation between rear output shaft 20 and transfer shaft 114 while providing a predetermined torque split therebetween.

To provide means for transferring drive torque from transfer shaft 114 to front output 32, a drive mechanism 122 is provided. Drive mechanism 122 includes a drive sprocket 124 fixed via a splined connection 126 to transfer shaft 114, a driven sprocket 128 fixed to a front output shaft 130 via a splined connection 132, and a continuous drive chain 134 meshed with both drive sprocket 124 and driven sprocket 128. Front output shaft 130 is adapted to be connected to front propshaft 34 in a conventional manner.

As noted, geartrain 42 is arranged to deliver drive torque at various speed ratios from input shaft 46 to mainshaft 48. As such, geartrain 42 includes a first synchronizer clutch assembly 136 operably installed between first input gear 62 and second input gear 66 on input shaft 46. First synchronizer clutch assembly 136 includes a hub 138 fixed (i.e., splined) for rotation with input shaft 46 and a clutch sleeve 140 supported for rotation with and bidirectional axial movement on hub 138. First synchronizer clutch assembly 136 is shown as a single-cone type arrangement with it understood that any suitable synchronizer clutch used for effecting synchronous gear changes between input shaft 46 and mainshaft 48 may be used. When clutch sleeve 140 is moved from the neutral position shown and denoted by reference line "N" to the position denoted by reference line "A", it functions to couple first input gear 62 to input shaft 46. In particular, movement of clutch sleeve 140 from its neutral (N) position to its (A) position caused synchronization between input shaft 46 and first input gear 62 such that the spline teeth of clutch sleeve 140 move into meshed engagement with clutch teeth on a clutch ring 142 fixed to first input gear 62. Conversely, when clutch sleeve 140 is moved from the neutral (N) position to the position denoted by construction line "B", it couples second input gear 66 to input shaft 46. Such movement of clutch sleeve 140 from its neutral (N) position to its (B) position causes speed synchronization between second compound gear 80 and input shaft 46 and permits the spline teeth of clutch sleeve 140 to move into engagement with clutch teeth formed on a clutch ring 144 fixed to second input gear 66. Clutch sleeve 140 is axially moveable relative to hub 138 in a well known manner in response to axial movement of a first shift fork, partially shown at reference numeral 145, caused by a suitable gear shift mechanism, schematically shown in FIG. 1 by block 147.

A second synchronizer clutch assembly 146, also shown as a single-cone arrangement, is operably installed on mainshaft 48 between second drive gear 68 and third drive gear 76. Synchronizer clutch assembly 146 includes a hub 148 fixed (i.e., splined) for rotation with mainshaft 48 and a clutch sleeve 150 that is supported for rotation with a bidirectional axial movement on hub 148. When clutch sleeve 150 is moved from the neutral position shown and denoted by reference line "N" to the position denoted by reference line "C", it couples second drive gear 68 to mainshaft 48, thereby coupling first compound gear 72 to mainshaft 48. Such movement of clutch sleeve 150 from its (N) position to its (C) position results in speed synchronization between mainshaft 48 and third drive gear 68, and the subsequent movement of the splines on clutch sleeve 150 into engagement with the clutch teeth formed on a clutch ring 154 fixed to second drive gear 68. Conversely, when clutch sleeve 150 is moved from the neutral (N) position to the position denoted by reference line "D", it couples third drive gear 76 to mainshaft 48. Again, following synchronization between third drive gear 76 and mainshaft 48, the spline teeth of clutch sleeve 150 move into meshed engagement with the clutch teeth formed on a clutch ring 156 fixed to third drive gear 76. Clutch sleeve 150 is axially movable between its "C" and "D" positions by means of a second shift fork, partially shown at 158, which is also coupled to gearshift mechanism 147.

Geartrain 42 also includes a synchronized reverse gear assembly 160 having a reverse input gear 162 in constant mesh with third input gear 74 and a reverse output gear 164 which is rotatably supported on a stubshaft 166. As seen, reverse input gear 162 is integrally formed on stubshaft 166. Reverse output gear 164 is in constant mesh with a reverse transfer gear 168 integrally formed on ring gear 84 of planetary gearset 56. This constant meshed engagement is shown schematically by phantom lines in FIG. 2. Additionally, geartrain 42 includes a third synchronizer clutch assembly 170, also shown to be of the single-cone type, which includes a hub 172 fixed (i.e., splined) to stubshaft 166 and a clutch sleeve 174 supported for rotation with and axial sliding movement on hub 172. Clutch sleeve 174 is movable between neutral position shown by reference line "N" to a position denoted by reference line "R" for coupling reverse output gear 164 to stubshaft 166, thereby transferring torque delivered to second compound gear 80 to ring gear 84 of planetary gearset 56 to establish a pair of reverse speed ratios as will be described. Specifically, the splines on clutch sleeve 174 move into engagement with the clutch teeth formed on a clutch ring 180 fixed to reverse output gear 164 following speed synchronization between reverse output gear 164 and reverse input gear 162. A third shift fork, partially shown at 178, is also interconnected to gearshift mechanism 147.

To provide means for delivering drive torque from mainshaft 48 to the input of interaxle differential 60, synchronized range shift mechanism 58 is provided in associated with planetary gearset 56. As best seen from FIG. 2, synchronized range shift mechanism 58 includes a fourth synchronizer clutch assembly 184 having a hub 186 fixed (i.e., splined) to an axial hub segment 188 of ring gear 84 which is rotatably supported on mainshaft 48. Synchronizer clutch assembly 184 further includes a drive hub 190 fixed (i.e., splined) to mainshaft 48 and a brake plate 192 fixed (i.e., bolted) to housing 45. A range sleeve 194 is supported for rotation with and bidirectional axial movement on hub 186 from the central non-actuated neutral (N) position shown to one of a high-range (H) position and a low-range (L) position via movement of a fourth shift fork 196, likewise connected to gearshift mechanism 147. Axial movement of range sleeve 194 from its neutral position (N) to its high-range position (H) results in speed synchronization between mainshaft 48 and ring gear 84. Following such speed synchronization, splines on range sleeve 194 can move into meshed engagement with clutch teeth formed on drive hub 190 for coupling ring gear 84 for direct rotation with mainshaft 48. Since sun gear 82 is also driven directly by mainshaft 48, such locking of ring gear 84 to mainshaft 48 results in carrier assembly 86 being rotatably driven at a direct speed ratio relative to mainshaft 48. Thus, with range sleeve 194 in its high-range (H) position, carrier assembly 86 is driven by mainshaft 48 for supplying drive torque to planet carrier 96 of interaxle differential 60 via a high-range power transmission route. Conversely, axial movement of range sleeve 194 from its neutral (N) position toward its low-range (L) position results in speed synchronization between ring gear 84 and housing 45, whereby ring gear 84 is braked against rotary motion. Following braking of ring gear 84, the splines of range sleeve 194 can move into meshed engagement with clutch teeth formed on a clutch ring 198 fixed to brake plate 192. With ring gear 84 held against rotation, carrier assembly 86 is driven at a reduced speed ratio relative to mainshaft 48 for establishing a low-range power transmission route between mainshaft 48 and planet carrier 96 of interaxle differential 60.

Figure 3:
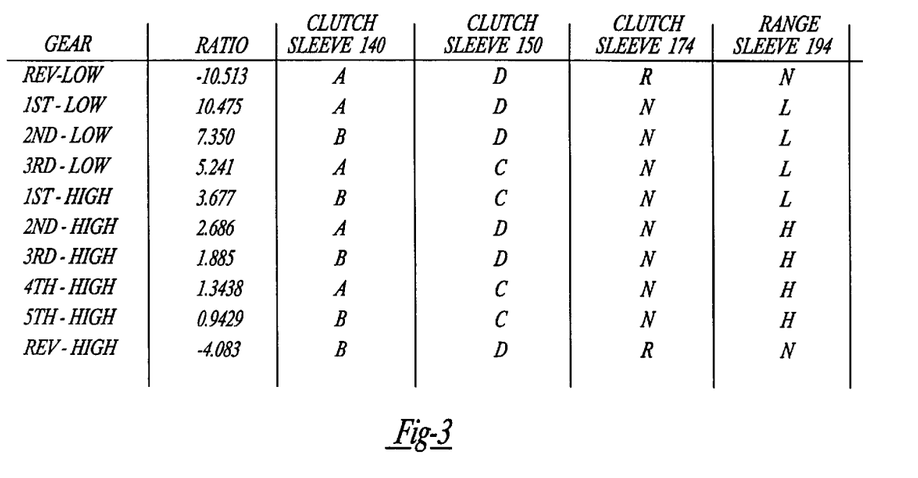
FIG. 3 is a chart listing the speed ratios that are available with the transmission of the present invention.

Referring now to FIG. 3, a chart is shown which identifies the positions of shift sleeves 140, 150, 174 and 194 for establishing at least eight forward speed ratios and a pair of reverse speed ratios. Preferably, the available speed ratios are segregated into a first or "High" set of gears and a second or "Low" set of gears. The High set of gears includes five forward speed ratios and a reverse speed ratio that are particularly well-suited for normal on-road driving conditions. In contrast, the Low set of gears includes three forward speed ratios and a reverse speed ratio that are well-suited for off-road driving needs. As a means of reducing the inertial loading during gear shifting, it can be seen that clutch sleeve 140 moves through its neutral position which shifting between each forward speed ratio. In addition, representative ratio values are listed to illustrate the sequential arrangement provided by transmission 20. To this end, the following Table lists the number of teeth associated with the gear components of transmission 20 for establishing the speed ratios. However, those skilled in the art will appreciate that different gear combinations can be used to modify the ratio values required for different vehicular applications.

TABLE

| Gear Component | No. Of Teeth |
| --- | --- |
| first input gear 62 | 32 |
| first drive gear 64 | 43 |
| second input gear 66 | 35 |
| second drive gear 68 | 33 |
| third input gear 74 | 26 |
| third drive gear 76 | 49 |
| sun gear 82 | 30 |
| ring gear 84 | 87 |

TABLE-continued

| Gear Component | No. Of Teeth |
|---|---|
| pinion gears 88 | 28 |
| reverse input gear 162 | 28 |
| reverse output gear 164 | 48 |
| reverse transfer gear 168 | 87 |

Gearshift mechanism 147 can be comprised of a shift system having a single gearshift lever for controlling selection of all available ratios. Alternatively, the High set of gears and the Low set of gears could have separate gearshift levers if desired. Gearshift mechanism 147 can be a manually-actuated arrangement having a gearshift lever coupled by a shift assembly to each of the four shift forks. Alternatively, an electronically-controlled shift-by-wire arrangement can be used wherein movement of the gearshift lever causes actuation of electrically-operated actuators which, in turn, cause movement of the shift forks.

Figure 4:
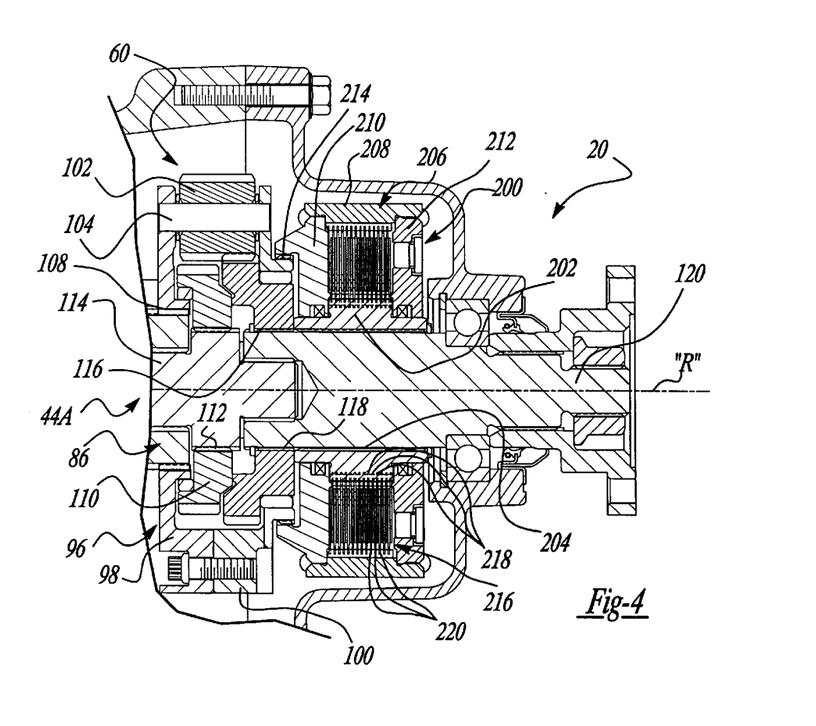
FIG. 4 is a partial sectional view illustrating a modified version of the transmission equipped with a transfer clutch.

Referring now to FIG. 4, transmission 20 is now partially shown to be optionally equipped with a power transfer mechanism 44A having a torque transfer clutch that is operable for controlling the torque biasing across interaxle differential 60 in response to the rotary speed difference (i.e., interaxle slip) between front output shaft 130 and rear output shaft 120. According to the embodiment shown, the transfer clutch is a viscous coupling 200 having an inner drum 202 fixed via a splined connection 204 to rear output shaft 120 and a cover assembly 206 supported and sealed relative to inner drum 202 for rotation relative thereto. Cover assembly 206 includes an outer drum 208 to which a front end plate 210 and a rear end plate 212 are secured. Front end plate 210 is shown to be fixed via a splined connection 214 for rotation with rear carrier ring 100 of planet carrier 96. A clutch pack 216 is retained within the sealed chamber formed between cover assembly 206 and inner drum 202 and includes a set of inner clutch plates 218 secured for rotation with inner drum 202 and a set of outer clutch plates 220 secured for rotation with outer drum 208. Inner and outer clutch plates 218 and 220 are alternately interleaved and the sealed chamber is filled with a predetermined volume of a viscous fluid. As is known, increasing relative rotation between outer drum 208 and inner drum 202 results in shearing of the viscous fluid within the sealed chamber for transferring torque through clutch pack 216 to the slower rotating components, thereby automatically biasing the torque transferred across interaxle differential 60. Viscous coupling 200 is conventionally referred to as a "passive" torque transfer device which generates progressive torque transfer characteristics dependent on the relative speed between clutch plates 218 and 220. Furthermore, it is contemplated that other passive torque transfer devices can be substituted for viscous coupling 200. For example, commonly-owned U.S. Pat. No. 5,456,642 to Frost discloses a geared traction unit which could easily be adapted for use in transmission 20 as a slip limiting device. As such, it is to be understood that the transfer clutch can be any suitable speed-sensitive and/or torque-sensitive device known to be applicable for use in four-wheel drive vehicles for limiting slip across an interaxle differential without input from the vehicle operator.

Figure 5:
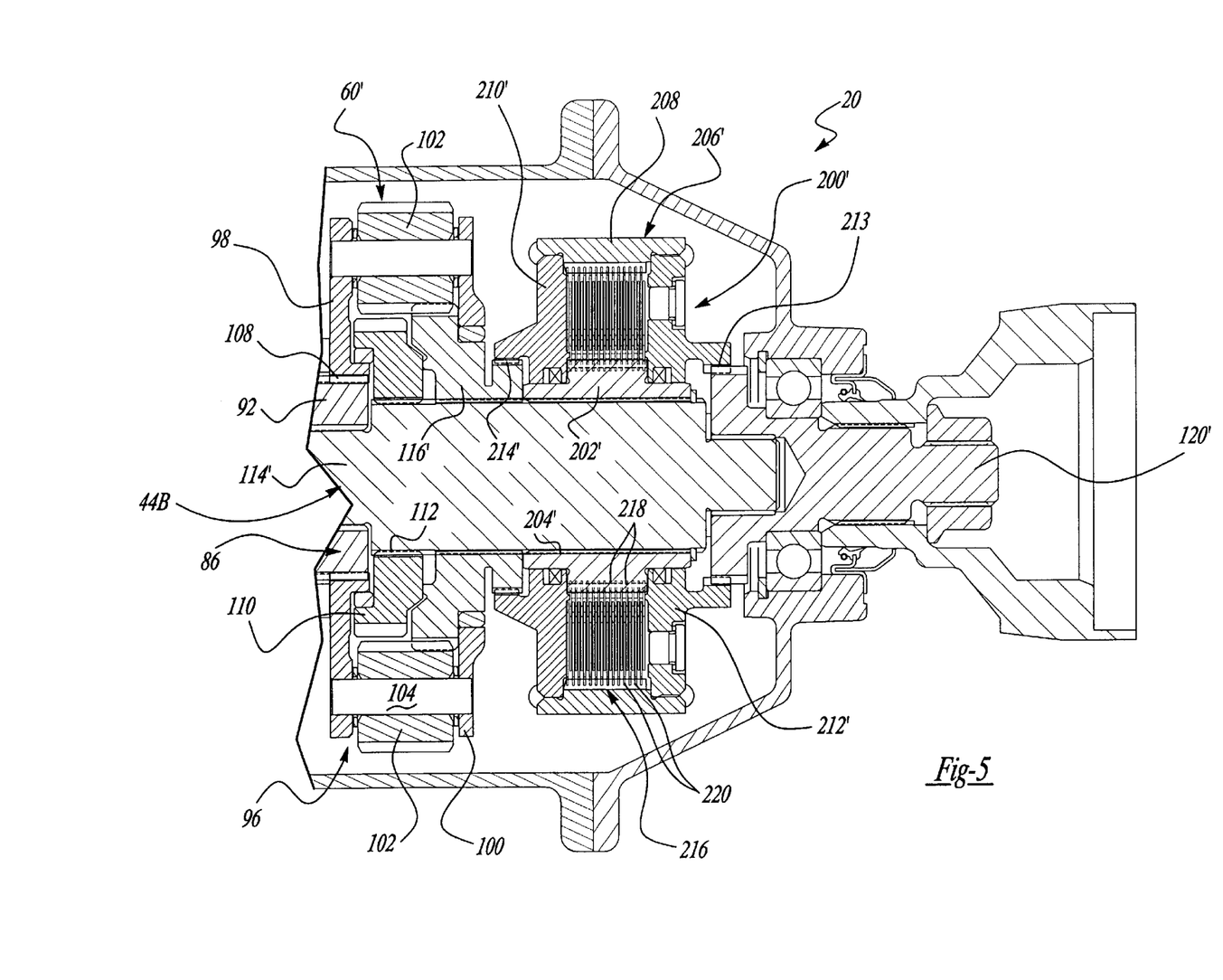
FIG. 5 is a partial view of an alternative arrangement for the transfer clutch shown in FIG. 4.

Referring now to FIG. 5, an optional power transfer mechanism 44B for transmission 20 is shown to be equipped with an alternative to the viscous coupling shown in FIG. 4. In particular, viscous coupling 200' has an inner drum 202' fixed via a splined connection 204' to transfer shaft 114' while front end plate 210' of cover assembly 206' is fixed via a splined connection 214' for rotation with second sun gear 116' of interaxle differential 60'. Second sun gear 116' is shown journally supported on transfer shaft 114'. Moreover, cover assembly 206' has a rear end plate 212' which is coupled via a splined connection 213 to rear output shaft 120'. As such, cover assembly 206' couples second sun gear 116' to rear output shaft 120'. The remainder of the components are generally similar to those shown and described for viscous coupling 200 in FIG. 4. It should be understood that viscous coupling 200' functions as a slip limiting/torque biasing device for limiting excessive slip across interaxle differential 60'.

Figure 6:
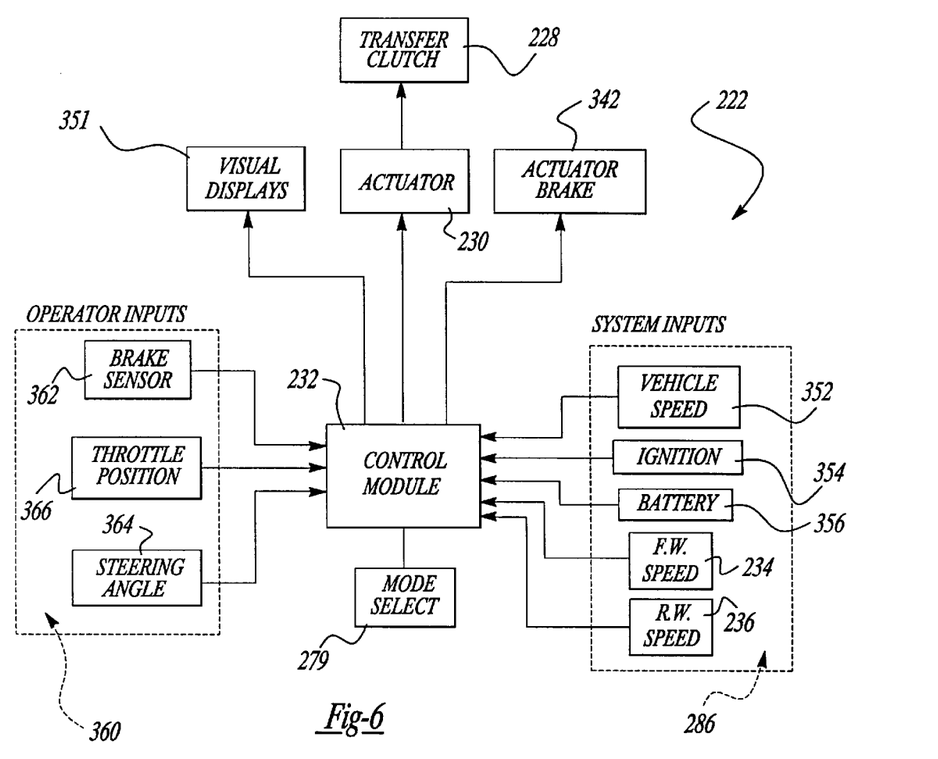
FIG. 6 is a block diagram of a control system for use with an electrically-actuated transfer clutch.

As an alternative to the passive transfer clutches shown in FIGS. 4 and 5, FIG. 6 illustrates a block diagram for an electronically-controlled power transfer system 222 that can be used to adaptively control the actuated condition of an electrically-actuated transfer clutch 228. Preferably, transfer clutch 228 is a friction clutch assembly having a multi-plate clutch pack and a thrust mechanism which applies a clutch engagement force on the clutch pack. The thrust mechanism is caused to move relative to the clutch pack in response to actuation of a power-operated actuator 230 which receives electric control signals from a controller 232. Actuator 230 can be any type (i.e., electromechanical, electromagnetic, hydraulically-actuated, etc.) of power-operated device suitable for causing controlled movement of the thrust mechanism. To this end, system 222 also includes a front speed sensor 234 for measuring the rotational speed ($n_F$) of front output shaft 130 (or transfer shaft 114 or front propshaft 34) and a rear speed sensor 236 for measuring the rotational ($n_R$) speed of rear output shaft 120 (or rear propshaft 40). The speed signals from sensors 234 and 236 are delivered to controller 232 which determines the magnitude of a speed differential ($\Delta N = n_r - n_f$) across differential 60. If the speed differential exceeds a predetermined threshold value, then controller 232 sends a control signal to actuator 230 for causing the thrust mechanism to apply a clutch engagement force to the clutch pack in transfer clutch 228, whereby drive torque is transferred to the slower turning one of output shafts 120 and 130. The threshold value can be stored in look-up tables or calculated from stored algorithms. The control scheme for actuator 230 can be classified as either of the ON/OFF type or the ADAPTIVE type. Under the ON/OFF control scheme, transfer clutch 228 is fully-actuated when the speed differential exceeds the threshold value and is fully de-actuated when the speed differential subsequently falls below the threshold value. Alternatively, the ADAPTIVE control scheme can be used to vary the magnitude of the clutch engagement force as a function of changes in the magnitude of the speed differential.

Figure 7:
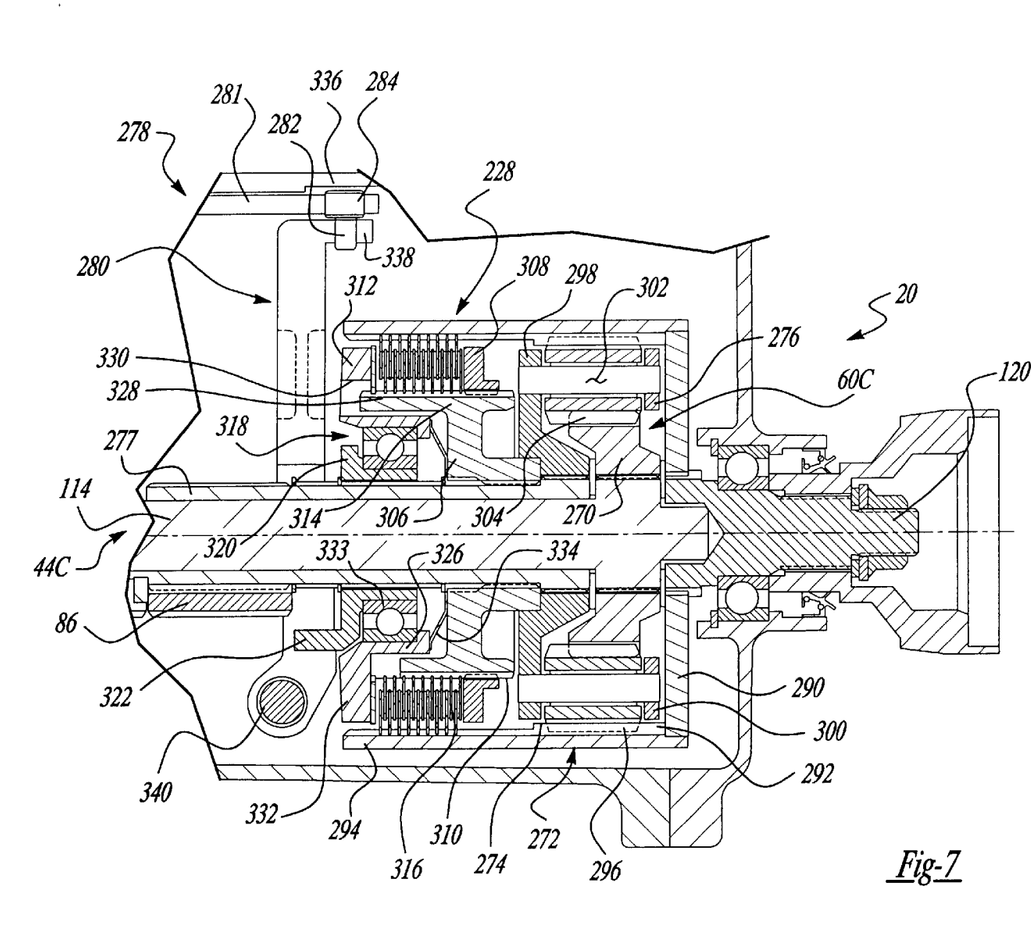
FIG. 7 is a partial sectional view illustrating the transmission equipped with an electrically-actuated transfer clutch.

Referring now to FIG. 7 of the drawings, a power transfer mechanism 44C for use in transmission 20 is partially shown to include an electrically-controlled transfer clutch 228. In this particular arrangement, the interaxle differential is a planetary gearset 60C having a first output member or sun gear 270 coupled (i.e., splined) for rotation with transfer shaft 114, a second output member or ring gear 272 coupled (i.e., splined) for rotation with a rear output shaft 120, and a plurality of pinion gears 274 carried by a planet carrier 276. Planet carrier 276 is coupled (i.e., splined) to a quill shaft 277 which, in turn, is coupled to carrier ring 92 of carrier assembly 86. As such, planet carrier 276 is the input member for differential 60C. Moreover, each pinion gear 274 is meshed with sun gear 270 and ring gear 272. As noted, power transfer system 222 controls actuation of transfer clutch 228 for automatically controlling the speed differentiation and the torque biasing between front and rear output shafts 130 and 120, respectively. Power transfer mechanism 44C is also shown to be equipped with a drive mechanism 278 which includes a pivotable lever arm 280 that is coupled to a sector plate 281. The bifurcated ends of lever arm 280 are retained for pivotal movement on a rail 340, the ends of which are retained in suitable sockets (not shown) formed in housing 45. A mode pin 282 secured to a flange portion 338 of lever arm 280 has a roller 336 fixed thereto which extends into a mode slot 284 formed in sector plate 281. The contour of mode slot 284 is designed to cause pivotal movement of lever arm 280 in response to rotation of sector plate 281. Preferably, actuator 230 is a gearmotor having a rotary output member fixed to sector plate 281 such that actuation of actuator 230 results in rotation of sector plate 281.

With continued reference to FIG. 7, a preferred construction for transfer clutch 228 will now be described. An end plate 290 connects ring gear 272 for rotation with rear output shaft 120. Ring gear 272 is defined by a set of internal gear teeth 292 formed on the inner peripheral surface of a cylindrical outer drum 294 that is fixed to end plate 290. Gear teeth 292 of ring gear 272 are shown in constant meshed engagement with gear teeth 296 of pinion gears 274. As is also shown, planet carrier 276 includes a pair of carrier rings 298 and 300 between which pinion gears 274 are journally supported for rotation on pins 302. Carrier ring 298 is fixed (i.e., splined) for rotation with quill shaft 277. Sun gear 270 has external gear teeth 304 formed thereon which are in constant meshed engagement with gear teeth 296 of pinion gears 274.

Transfer clutch 228 is a mechanically-actuated friction clutch assembly arranged to concentrically surround a portion of quill shaft 277. Transfer clutch 228 also includes inner drum 306 that is fixed (i.e., splined) to quill shaft 277 for rotation therewith. Thus, outer drum 294 surrounds inner drum 306 to form an annular chamber therebetween, with outer drum 294 and inner drum 306 being capable of rotating relative to one another. A stop plate 308 is splined for rotation with inner drum 306 and abuts a radial flange stop 310 formed thereon. Disposed within the chamber is a clutch pack comprised of two sets of alternatively interleaved friction clutch plates that can be frictionally engaged for limiting speed differentiation and biasing the torque distribution across interaxle differential 60C. Inner clutch plates 312 are mounted (i.e., splined) to a rim segment 314 of inner drum 306 for driven rotation with quill shaft 277. Likewise, outer clutch plates 316 are mounted (i.e., splined) to outer drum 294 for rotation with rear output shaft 130. The interleaved clutch plates are supported for axial sliding movement to establish frictional contact therebetween.

Transfer clutch 228 also includes a thrust mechanism 318 which is supported for axial sliding movement on the outer circumference of quill shaft 277 and is operable for frictional compressing the interleaved clutch plates as a function of the clutch engagement force exerted thereon. Thrust mechanism 318 includes an inner bearing support 320 which is journally supported for sliding non-rotatable movement on quill shaft 277. Inner bearing support 320 includes one or more axial flanges 322 that are nested within corresponding apertures in lever arm 280 for limiting rotation of inner bearing support 320 relative to quill shaft 277 and inner drum 306. Thrust mechanism 318 also includes an outer bearing support 326 coupled for rotation with inner drum 306. As seen, axial lugs 328 formed on the distal end of cylindrical rim segment 314 are nested within apertures 330 in a plate segment 332 of outer bearing support 326. A bearing assembly 333 is retained between inner bearing support 320 and outer bearing support 326. Thus, outer bearing support 326 is supported for rotation with inner drum 306 while inner bearing support 320 is held stationary relative thereto. Thrust pads or buttons mounted to lever arm 280 act on inner bearing support 320 for causing sliding movement of thrust mechanism 318 in response to pivotal movement of lever arm 280 for causing a clutch engagement force to be exerted by plate segment 332 of outer bearing support 326 on the interleaved clutch plates. An annular return spring 334 is retained between inner drum 306 and outer bearing support 326 for normally biasing thrust mechanism 318 in a direction away from the interleaved clutch plates.

In the embodiment shown, actuator 230 is an electric gearmotor which is operable for generating an output torque, the value of which varies as a function of the magnitude of the electrical control signal applied thereto by controller 232. Accordingly, drive mechanism 278 is interconnected to the output member of gearmotor 230 for changing the output torque into an axially-directed force used for controlling the clutch engagement force applied to thrust mechanism 318 of transfer clutch 228. As such, the direction and magnitude of rotation of sector plate 281 causes corresponding pivotal movement of lever arm 280 which, in turn, causes sliding movement of thrust mechanism 318 for exerting the clutch engagement force on the interleaved clutch plates. Since the magnitude of the clutch engagement force generated by lever arm 280 and applied to transfer clutch 228 is proportional to the magnitude of the output torque generated by gearmotor 230 which, in turn, is proportional to the magnitude of the control signal (i.e., percentage duty cycle) applied by controller 232 to gearmotor 230, the magnitude of the clutch engagement force exerted on transfer clutch 228 is also proportional to the magnitude of the control signal.

As noted, controller 232 can be programmed to automatically control actuation of transfer clutch 228 pursuant to the "ON/OFF" control scheme. In such an arrangement, transfer clutch 228 is normally maintained in a non-actuated condition to permit speed differentiation between front and rear output shafts 130 and 120, respectively. In this condition, transmission 20 is operating in its full-time four-wheel drive mode. However, when the sensor input signals indicate a vehicular condition exceeding a predetermined value, transfer clutch 228 is fully actuated such that front and rear output shafts 120 and 130 are, in effect, rigidly coupled for establishing a "non-differentiated" four-wheel drive mode. Preferably, the vehicular condition used for controlling actuation of transfer clutch 228 is the magnitude of the speed differential (ΔN) between front propshaft 34 and rear propshaft 40 or between front output shaft 130 and rear output shaft 120. Thereafter, transfer clutch 228 is returned to its non-actuation condition when the sensor input signals indicate that the magnitude of the vehicular condition is less than the predetermined value. Alternatively, controller 232 can be programmed in the "ADAPTIVE" control scheme to regulate the actuated condition of transfer clutch 228 between its non-actuated and fully-actuated limits for varying the magnitude of speed differentiation and drive torque transmitted across interaxle differential 60C as a function of the speed sensor input signals. In either of the above-noted control schemes, control over actuation of transfer clutch 228 is automatic and does not require any act or mode selection on the part of the vehicle operator.

As a further option, a mode select mechanism 279 can be incorporated into system 222 to permit the vehicle operator to select one of an "Automatic" four-wheel drive mode and a "Locked" four-wheel drive mode. When the Automatic mode is selected, the actuated condition of transfer clutch 228 is controlled pursuant to either of the ON/OFF or ADAPTIVE control schemes without input from the vehicle operator. However, when the "Locked" drive mode is selected, transfer clutch 228 is fully-actuated to lock-up differential 60C for continuously delivering non-differentiated drive torque to output shafts 130 and 120. Moreover, a brake 342 can be used for braking the output member of actuator 230 to maintain sector plate 281 and lever arm 280 in corresponding locked positions following selection via mode select mechanism 279 of the Locked mode. Brake 342 permits the power to actuator 230 to be interrupted for minimizing its on-time service requirements. The "Locked" four-wheel drive mode is provided for permitting improved traction when the motor vehicle is being operated off-road or on severe road conditions. Mode select mechanism 279 can include any suitable selector mechanism (i.e., shift lever, push-button, etc.) capable of generating a mode signal inputted to controller 232.

With reference again to FIG. 6, a block diagram of control system 222 is shown. Preferably, controller 232 is an electronic control module 350 having signal processing and information storage capabilities. A visual display 351 is provided within the passenger compartment of the vehicle to indicate the particular mode selected by mode select mechanism 279. In addition to speed sensors 234 and 236, a first sensor group 286 is shown to optionally include various "system" sensors that can be provided for detecting and signaling specific dynamic and operational characteristics of the motor vehicle. The input signals generated by the "systems" sensor group are delivered to electronic control module 350. First sensor group 286 includes a vehicle speed sensor 352 for sensing a vehicle speed, an ignition switch 354 for signalling the operational status of the vehicle, and a battery input 356 for powering electronic control module 350. In vehicles equipped with an anti-lock brake system (ABS), the original equipment ABS sensors provided at each wheel can be used for determining an "average" front drive shaft speed and rear drive shaft speed. Moreover, it is possible for vehicle speed sensor 352 to be eliminated with the vehicle speed signal being computed from the front rotational speed signal generated by front speed sensor 234. However, it is to be understood that any suitable speed sensing arrangement capable of generating a signal indicative of the rotational speed of a shaft is fairly within the scope of the present invention.

Control system 222 also illustrates the optional use of various "operator-initiated" inputs, as generally categorized by second sensor group 360. These inputs include a brake sensor 362 for sensing when the vehicle operator is applying the brakes, a steering angle sensor 364 for detecting the magnitude of a steering angle, and an accelerator sensor for sensing an accelerating condition of the vehicle. Preferably, the accelerator sensor is a throttle position sensor 366 for sensing the degree of opening of a throttle valve associated with engine 18 or for sensing the degree of depression of an accelerator pedal, and is operable to produce a throttle position signal. The operator-initiated input signals are delivered to control module 350 where they are used, in conjunction with the system input signals, to further control "on-demand" operation. It is contemplated that any control system operable for controlling actuation of actuator 230 based on predetermined relationship(s) between the speed difference (ΔN) and the desired torque distribution between the drivelines can be used with the present invention. An example of one suitable control system applicable to adaptively control transfer clutch 228 and the torque biasing/slip limiting across interaxle differential 60C is disclosed in commonly-owned U.S. Pat. No. 5,582,263.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A transmission for use in a four-wheel drive motor vehicle having an engine and front and rear drivelines, said transmission comprising:

an input shaft adapted to be driven by the engine;

a mainshaft;

a front output shaft adapted to drive the front driveline;

a rear output shaft adapted to drive the rear driveline;

constant mesh gearsets which can be selectively engaged to couple said mainshaft to said input shaft for driven rotation at predetermined speed ratios, said constant mesh gearsets including a first input gear rotatable supported on said input shaft, a first compound gear rotatable supported on said mainshaft and having a first drive gear meshed with said first input gear and a second drive gear, a second compound gear rotatably supported on said input shaft and having a second input gear meshed with said second drive gear and a third input gear, a third drive gear rotatably supported on said mainshaft and meshed with said third input gear, a first synchronizer clutch for selectively coupling one of said first and second input gears to said input shaft, and a second synchronizer clutch for selectively coupling one of said second and third drive gears to said mainshaft;

a planetary gearset having a sun gear driven by said mainshaft, a ring gear, a carrier, and a pinion gear meshed with said sun gear and ring gear and which is rotatably supported on said carrier;

an interaxle differential interconnecting said carrier to said front and rear output shafts, said interaxle differential having an input member driven by said carrier, a first output member driving said front output shaft, and a second output member driving said rear output shaft;

a range clutch which can be selectively engaged to couple said ring gear to said mainshaft for driving said input member at a first speed ratio relative to said mainshaft, and said range clutch can further be selectively engaged to couple said ring gear to a stationary member for driving said input member at a second speed ratio relative to said mainshaft;

a shift mechanism for controlling selective engagement of said constant mesh gearsets and said range clutch to establish a plurality of forward and reverse gears; and a transfer clutch for automatically controlling speed differentiation and torque biasing between said front and rear output shafts in response to the occurrence of slip therebetween.

2. The transmission of claim 1 wherein said range clutch includes a range sleeve mounted for rotation with said ring gear and movable between a first position whereat said ring gear is coupled to said mainshaft and a second position whereat said ring gear is coupled to a housing, a first synchronizer for causing speed synchronization between said ring gear and said mainshaft in response to movement of said range sleeve to said first position, and a second synchronizer for causing speed synchronization between said ring gear and said housing in response to movement of said range sleeve to said second position.

3. The transmission of claim 1 further comprising a transfer shaft coupled to said first output member of said interaxle differential, and a drive mechanism coupling said transfer shaft to said front output shaft.

4. The transmission of claim 1 wherein said constant mesh gearsets further include a reverse input gear meshed with said third input gear, a reverse output gear meshed with a transfer gear fixed to said ring gear, and a third synchronizer clutch for selectively coupling said reverse output gear to said reverse input gear.

5. The transmission of claim 1 wherein said transfer clutch is operable for selectively coupling any two of said input member and said first and second output members of said interaxle differential to automatically regulate speed differentiation therebetween.

6. The transmission of claim 5 wherein said transfer clutch is a viscous coupling.

7. The transmission of claim 5 wherein said transfer clutch includes a clutch pack, and an actuator for controlling the clutch engagement force exerted on said clutch pack, said actuator being actuated by control signals sent thereto by a controller.

8. The transmission of claim 7 wherein said controller receives sensor input signals indicative of operating characteristics of the vehicle and generates said control signals in response to said sensor input signals.

9. The transmission of claim 8 wherein said sensor input signals include front and rear speed signals that are indicative of the rotary speed of said front and rear output shafts, and wherein said controller determines the value of a speed difference between said front and rear output shafts based on said speed signals and controls actuation of said actuator as a function of said speed difference value.

10. The transmission of claim 9 wherein said controller employs an on/off control scheme for controlling actuation of said actuator.

11. The transmission of claim 9 wherein said controller employs an adaptive control scheme for controlling actuation of said actuator.

12. The transmission of claim 8 further comprising a mode select mechanism capable of generating a mode signal which is sent to said controller and is indicative of selection of one of an Automatic mode and a Locked mode, said controller causes said actuator to fully engage said transfer clutch when said Locked mode is selected, and said controller controls the actuated condition of said transfer clutch as a function of the value of said operating characteristic when said Automatic mode is selected.

13. A transmission for use in a four-wheel drive motor vehicle having an engine and front and rear drivelines, said transmission comprising:

an input shaft adapted to be driven by the engine;

a mainshaft;

a front output shaft adapted to drive the front driveline;

a rear output shaft adapted to drive the rear driveline;

constant mesh gearsets which can be selectively engaged to couple said mainshaft to said input shaft for driven rotation at predetermined speed ratios, said constant mesh gearsets including a first input gear rotatably supported on said input shaft, a first compound gear rotatably supported on said mainshaft and having a first drive gear meshed with said first input gear and a second drive gear, a second compound gear rotatable supported on said input shaft and having a second input gear meshed with said second drive gear and a third input gear, a third drive gear rotatable supported on said mainshaft and meshed with said third input gear, a first synchronizer clutch for selectively coupling one of said first and second input gears to said input shaft, and a second synchronizer clutch for selectively coupling one of said second and third drive gears to said mainshaft;

a planetary gearset having a sun gear driven by said mainshaft, a ring gear, a carrier, and a pinion gear meshed with said sun gear and ring gear and which is rotatably supported on said carrier;

an interaxle differential for transferring drive torque from said carrier to said front and rear output shafts while permitting speed differentiation therebetween, said interaxle differential having an input member driven by said carrier, a first output member driving said front output shaft, and a second output member driving said rear output shaft;

a range clutch which can be selectively engaged to couple said ring gear to said mainshaft for driving said input member at a first speed ratio relative to said mainshaft, said range clutch can further be selectively engaged to couple said ring gear to a stationary member for driving said input member at a second speed ratio relative to said mainshaft;

a transfer clutch for controlling the torque distribution and speed differentiation between said front and rear output shafts by varying a clutch engagement force exerted on a clutch pack, said transfer clutch including a thrust mechanism operable in a first position to establish a minimum clutch engagement force and in a second position to establish a maximum clutch engagement force, and an actuator for moving said thrust mechanism;

sensor means for detecting an operating characteristic of the vehicle and generating a sensor input signal in response thereto; and a controller for receiving said sensor input signal and controlling actuation of said actuator in accordance with the magnitude of said operating characteristic.

14. The transmission of claim 13 wherein said range clutch includes a range sleeve mounted for rotation with said ring gear and movable between a first position whereat said ring gear is coupled to said mainshaft and a second position whereat said ring gear is coupled to a housing, a first synchronizer for causing speed synchronization between said ring gear and said mainshaft in response to movement of said range sleeve to said first position, and a second synchronizer for causing speed synchronization between said ring gear and said housing in response to movement of said range sleeve to said second position.

15. The transmission of claim 13 further comprising a transfer shaft coupled to said first output member of said interaxle differential, and a drive mechanism coupling said transfer shaft to said front output shaft.

16. The transmission of claim 13 wherein said constant mesh gearsets further include a reverse input gear meshed with said third input gear, a reverse output gear meshed with a transfer gear fixed to said ring gear, and a third shift clutch for selectively coupling said reverse output gear to said reverse input gear.

17. The transmission of claim 13 wherein said sensor means include speed sensors for sensing the rotational speed of said front and rear output shafts and generating front and rear speed signals indicative thereof, and wherein said controller receives said speed signals and generates a speed differential signal that is indicative of a speed differential between said front and rear output shafts, said controller is operable for controlling actuation of said actuator in accordance with the magnitude of said speed differential signal for moving said thrust mechanism from said first position to said second position when said speed differential signal exceeds a predetermined value and for moving said thrust mechanism from said second position to said first position when said speed differential signal is less than said predetermined value.

18. The transmission of claim 17 further comprising a mode select mechanism for enabling a vehicle operator to select one of an Automatic four-wheel drive mode and a Locked four-wheel mode and generate a mode signal indicative of the particular mode selected, and wherein said controller controls actuation of said actuator in accordance with said speed differential signal and said mode signal, said controller causing said actuator to control the position of said thrust mechanism between one of said first and second positions as a function of the magnitude of said speed differential signal when said Automatic four-wheel drive mode is selected, said controller further operable for causing said actuator to move said thrust mechanism to said second position when said Locked four-wheel drive mode is selected.

19. The transmission of claim 13 wherein said sensor means include speed sensors for sensing the rotational speed of said front and rear output shafts and generating front and rear speed signals indicative thereof, and wherein said controller receives said speed signals and generates a speed differential signal that is indicative of a speed differential between said front and rear output shafts, and wherein said controller is operable for continuously controlling actuation of said actuator in proportion to variations in said speed differential signal.

20. The transmission of claim 19 further comprising a mode select mechanism for enabling a vehicle operator to select one of an Automatic four-wheel drive mode and a Locked four-wheel mode and generate a mode signal indicative of the particular mode selected,and wherein said controller controls actuation of said actuator in accordance with said speed differential signal and said mode signal, said controller causing said actuator to modulate the position of said thrust mechanism between said first and second positions as a function of the magnitude of said speed differential signal for continuously varying the torque transmitted through said transfer clutch when said Automatic four-wheel drive mode is selected, said controller is further operable for causing said actuator to move said thrust mechanism to said second position when said Locked four-wheel drive mode is selected.

* * * * *